Figure 1:
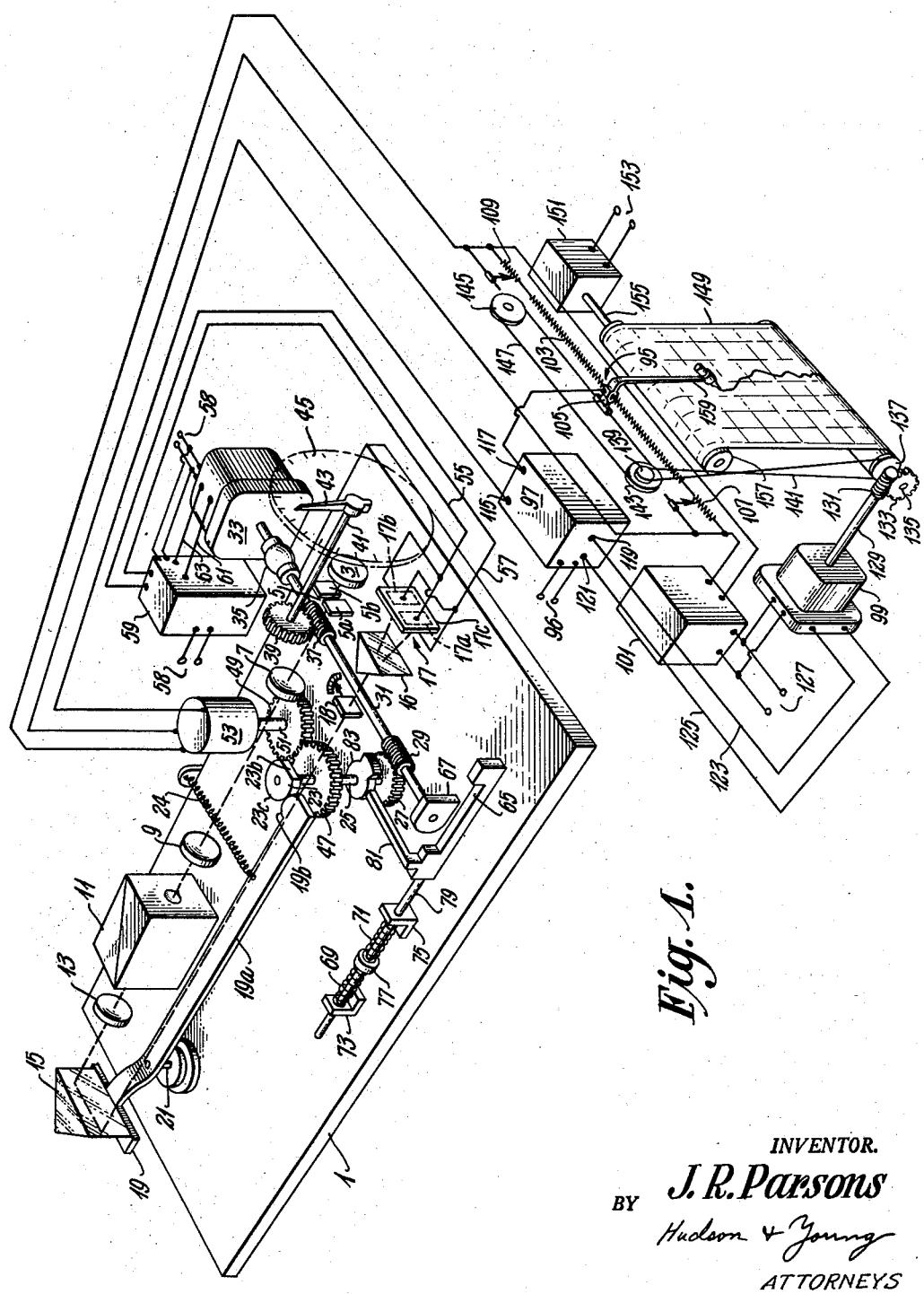

June 16, 1959  J. R. PARSONS  2,891,239
ANGULAR POSITION TELEMETERING SYSTEM
Filed April 9, 1954  2 Sheets-Sheet 1

INVENTOR.
J. R. Parsons
BY Hudson & Young
ATTORNEYS

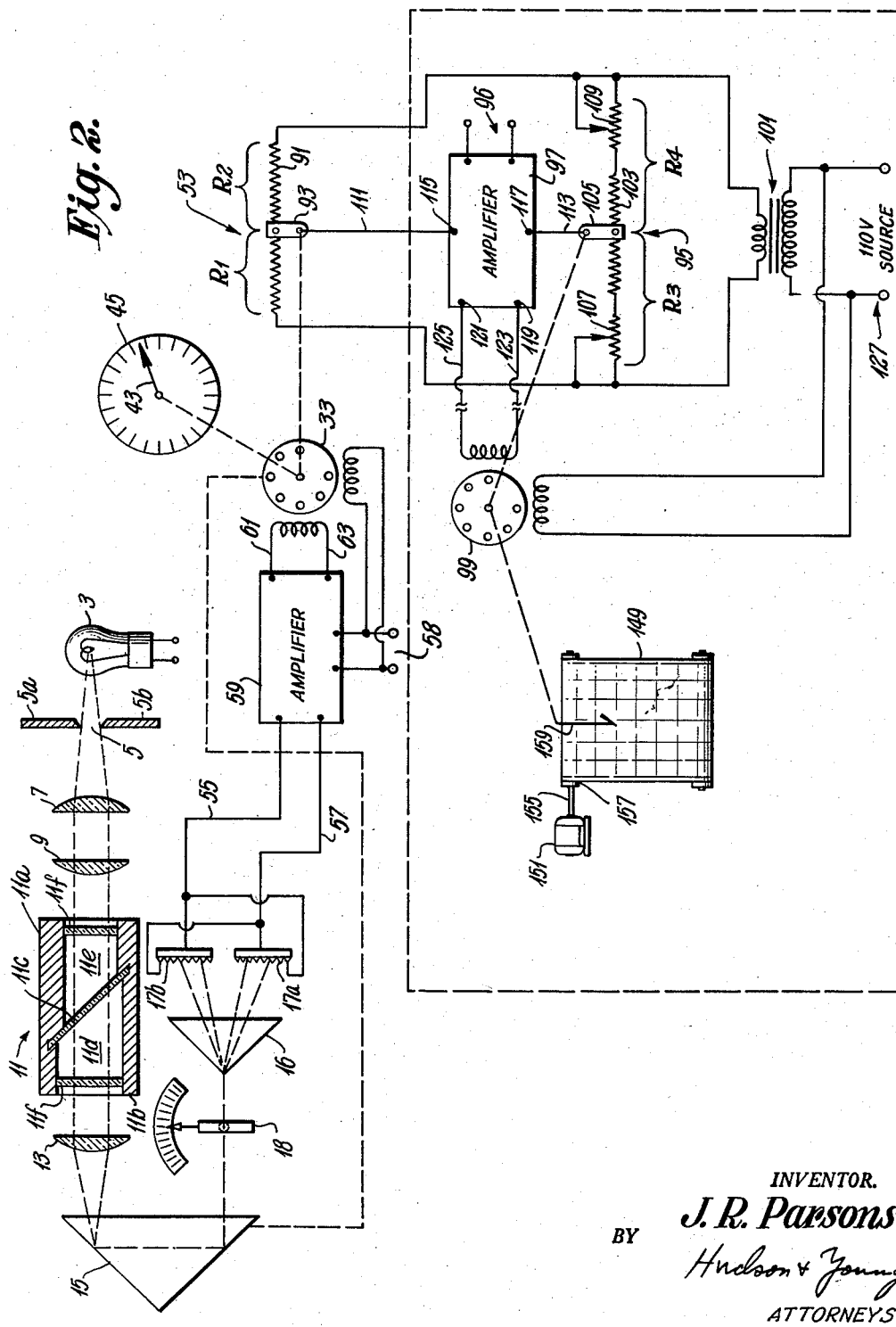

No. 2,891,239
Patented June 16, 1959

2,891,239

ANGULAR POSITION TELEMETERING SYSTEM

James R. Parsons, Bartlesville, Okla., assignor to Phillips Petroleum Company, a corporation of Delaware Application April 9, 1954, Serial No. 422,139

2 Claims. (Cl. 340—190)

This invention relates to an angular position telemetering system for a differential refractometer. In a more specific aspect, this invention relates to an improved combination of a remotely-positioned differential refractometer for measuring and/or control of a process variable and an electrical translating means for translating the measurement to an indicator-recorder.

It is well known practice to control various types of industrial processes by an analysis of a sample stream removed from some point in the process and by adjustment of a selected process variable in response to variations in a given property of a sample stream. One particular system of analysis and control that has been proposed and desired is that of comparing the refractive index of a sample stream with the refractive index of a standard material, employing any variance in composition of the sample stream to actuate suitable control apparatus to adjust a selected process variable whereby the composition of the sample stream is returned to the desired value.

A desirable characteristic of a process variable measurement device is that the information obtained by the device is readily available at a central point, for example, a control panel, to the operator of the process to facilitate integration of the measurement data with other control data and thereby to afford immediate, economic, and safe control of the process. In the petroleum industry it is desirable to remove, to the greatest extent possible, electric motors and electric equipment to a central control zone in order to reduce the hazard of explosions or fires. Operating costs are reduced also when process control data is translated to a central point enabling one operator to do the work of several men in taking and recording readings from measurement devices.

One such measurement device is a differential refractometer which comprises a means for producing a collimated narrow beam of light, a refractometer cell for refracting the light beam by an amount proportional to the difference between the refractive indices of two fluids contained therein, at least one of said fluids being a process stream concerning which control data is desired, a rotatable totally-reflecting prism for directing the light beam emerging from said refractometer cell to a dual radiation detector unit, means actuated by the light impinging on said detector unit to rotate the prism until the light beam is focused at a predetermined position on the detector unit and means for indicating the degree of rotation of the prism in directing the light beam upon said position on the detector unit.

It is contemplated that the apparent difference in refractive indices of the sample fluid and the reference fluid provided by such a measurement device and translated to a remote point in accordance with the present invention can be employed in many automatic control systems, such as for example, to control a fractional distillation column in a refinery by adjustment of the heat supplied to the column, the reflux ratio or the feed rate, it being apparent that the apparatus of this invention is useful for indicating or control purposes wherever variations in the composition of a sample stream produce variations in the refractive index thereof.

Accordingly, it is an object of this invention to provide a continuous analyzing device, utilizing the principle of differential refraction and an electrical translating system for reproducing the analytical data obtained thereby at a remote point.

A further object is to provide a differential refractometer wherein the angular position of a rotatable shaft represents the difference in refractive index of a sample fluid and a standard fluid and an angular position telemetering circuit for reproducing the angular position of said shaft at a remote point.

A still further object is to provide a differential refractometer, an indicator or recorder at a remotely positioned control zone and a telemetering system for translating the refractive index measurements to the indicator or recorder at the control panel.

To accomplish the above-stated objects, I have invented a novel combination of a differential refractometer at a remote position, an indicator-recorder which is at a control zone and an angular position telemetering circuit connecting the remotely positioned differential refractometer to the indicator-recorder. My invention thus provides a valuable tool in the operation and control of industrial processes. Important features of my invention comprise the telemetering circuit which incorporates a balanced bridge arrangement and a pair of adjustable resistances connected to the slide wire resistance of one of the potentiometers in the telemetering circuit which provide full scale readings in the indicator-recorder associated with my invention.

Various other objects, advantages and features will become apparent from the following description taken in conjunction with the accompanying drawing, in which:

Figure 1 is a schematic view of the overall differential refractometer, remotely positioned recorder and indicator and electrical translating circuit connecting same; and Figure 2 is a schematic view of the optical path and electrical circuit of the present invention.

Referring now to Figure 1, the differential refractometer includes a base 1 upon which is supported a source 3 of radiation. Light from source 3 is directed through a narrow slit 5 defined by opaque plates 5a and 5b having sharp edges opposing one another, and then through a convex lens 7 which is positioned adjacent slit 5 at a distance from source 3 such that the focal point of lens 7 is at a point between slit 5 and source 3. A second convex lens 9 is mounted at the focal point of lens 7. The beam of light passes through slit 5, lens 7, and lens 9 to a refractometer cell 11, in which the beam is deviated by an amount proportional to the difference in refractive indices of two fluids contained therein.

The light beam emerging from cell 11 passes through a lens 13 and is reflected by a rotatable totally-reflecting prism 15 to a dual or twin radiation detector unit 17. The rotatable prism 15 is rotated, by means to be hereinafter described, in response to the radiation impinging upon detector unit 17 in a manner such that the light strikes either between the twin detectors of twin detector unit 17 or strikes a preselected portion of detector unit 17 at all times. The degree of rotation of prism 15 necessary to so position the light beam on detector unit 17 is a measure of the difference between the refractive indices of the two fluids contained within refractometer cell 11. A glass prism 16 is positioned in the beam of radiation immediately in front of detector unit 17 when it is desired to have the beam strike a preselected portion of both the detectors in twin detector unit 17 when the beam is in its middle position. Use of prism 16 is preferred since more effective use of detector unit 17 is thereby obtained. A rectangular prism 18 is disposed in the beam of radiation intermediate prism 15 and prism 16. Prism 18 is manually rotatable and affords a means for adjusting the beam so that an equal quantity of the beam strikes each of the twin detectors in detector unit 17 initially.

Refractometer cell 11 is of the type wherein a sample fluid and a reference fluid are contained in adjacent sections thereof and separated by a plate of transparent material. It is desirable that the pressure on the two fluids be maintained substantially the same and a suitable refractometer cell for this purpose is disclosed in the copending application of B. J. Simmons, Serial No. 264,515, filed January 2, 1952, entitled "Fluid Pressure Equalizer" now Patent No. 2,736,332. A desirable refractometer cell wherein the temperature of the sample fluid and the reference fluid are maintained the same is disclosed in the copending application of Elmer C. Miller et al., Serial No. 264,458, filed January 2, 1952, now Patent No. 2,857,799 entitled "Differential Refractometer."

The rotatable totally-reflecting prism 15 can be formed of any suitable material wherein the relationship between the index of refraction of the material and the angles of the prism is such that the beam of light is totally reflected by the prism. A preferred material for this purpose is either crown or flint glass.

The prism 15 is mounted upon a frame 19 and positioned so that the front surface of the prism is perpendicular to the path of the light beam. Frame 19 is provided with an extended integral arm 19a, pivotally mounted on base 1 by a vertical rotatable shaft 21 which is positioned so that when the front surface of the prism is perpendicular to the path of the light beam, the light beam is reflected to impinge on the preselected portion of detector unit 17. The end of arm 19a opposite the prism is provided with a rounded portion 19b which makes slidable contact with a rotatable cam 23 to be described in greater detail hereinafter.

The dual radiation detector unit 17 includes the detector units 17a and 17b mounted upon an insulating plate 17c. When visible light is employed for purposes of analysis, as is normally the case, detectors 17a and 17b are preferably photovoltaic cells. Detectors 17a and 17b are disposed symmetrically with respect to the beam of radiation reflected thereon from prism 15 such that said reflected beam normally impinges between detectors 17a and 17b. If infra-red radiation is employed for the analysis, detectors 17a and 17b can be replaced by bolometers, thermistors, or other suitable infra-red detectors; while, if other frequencies of radiation are employed, suitable detectors therefor are provided.

As previously indicated, the position of prism 15 is regulated by means of a rotatable cam 23, having a flat portion 23b and a rounded portion 23c, which is in slidable connection with the rounded portion 19b of arm 19a. Arm 19a is biased in position against cam 23 by a spring 24 attached to base 1 and arm 19a. Cam 23 is carried by a vertical rotatable shaft 25 which is journaled in base 1 and which also carries a spur gear 27 meshing with a worm gear 29 carried on a horizontal shaft 31. Shaft 31 is rotated by means of a reversible two-phase electrical motor 33 mounted on suitable heat insulating blocks, not shown. Shaft 31 and motor 33 are coupled by means of a flexible connecting device 35. Shaft 31 also carries a second worm gear 37 which meshes with a spur gear 39 carried on a horizontal shaft 41. An indicating pointer 43 is attached to the end of shaft 41 and is provided with a calibrated dial 45 which indicates the differences in refractive indices of the fluids in cell 11.

A second spur gear 47 also is carried by shaft 25 so as to mesh with a spur gear 49 which rotates a vertical shaft 51 of a telemetering potentiometer unit 53.

Referring now to Figure 2, the radiation detectors 17a and 17b are connected in opposition by means of electrical leads 55 and 57 so as to produce a resultant voltage proportional to the difference in total radiation impinging upon the two detectors. The voltage appearing between leads 55 and 57 is supplied to the input terminals of an amplifier 59 wherein said voltage is amplified and the output of amplifier 59 is connected by leads 61 and 63 to one phase winding of motor 33, said motor being mechanically coupled as previously described in Figure 1 through shaft 31, worm gear 29, spur gear 27, shaft 25, spur gears 47 and 49 and shaft 51 to potentiometer 53. A source 58 of alternating current is provided for amplifier 59 and the other phase winding of motor 33 is also connected to source 58.

Referring now to Figure 1, the possible rotation of prism 15 by cam 23 is limited by a slidable frame 65 which rests upon base 1. A cam 67 carried on the end of motor shaft 31 is free to rotate within frame 65 so long as frame 65 is positioned centrally, within selected limits, with respect to cam 67. Frame 65 normally is maintained in a symmetrical position with respect to cam 67 by means of compression springs 69 and 71 disposed between guide supports 73 and 75, respectively, and a common central flanged portion 77 of rod 79, the end of rod 79 being attached to frame 65 at one end. Frame 65 is further provided with an integral arm 81 which engages a cam stop member 83 carried on shaft 25. As long as the light beam reflected from prism 15 is deviated such that arm end 19b rests upon the curved portion 23c of cam 23, the position of cam stop member 83, as determined by the rotation of shafts 25 and 31 by motor 33, is such that frame 65 remains disposed with respect to cam 67 so as to allow free rotation of cam 67 within frame 65. However, when the light beam is deviated to either side such that arm end 19b engages the flat portion 23b of cam 23, cam stop member 83 engages arm 81 thereby displacing frame 65 into contact with rotating cam 67. This prevents further rotation of shafts 25 and 31, which in turn prevents the indicating and recording means to be hereinafter described from going beyond their calibrated scales. With these apparatus elements shown in Figure 1 for controlling the rotation of shafts 25, 31 and 51, the possible rotation of these shafts is limited to from 10 percent to 90 percent of full rotation.

The optical system of this invention is represented schematically in Figure 2. Lens 7 is focused at a point between the filament of light source 3 and slit 5, formed by opaque plates 5a and 5b, to provide maximum light through cell unit 11, and light from slit 5 is collimated by lens 9 so that light from said slit 5 is transmitted through cell unit 11 as parallel rays. Cell unit 11 is illustrated in further detail in Figure 2 and is desirably constructed of two blocks 11a and 11b of heavy and heat absorbing material. A diagonally placed transparent plate 11c divides the space between blocks 11a and 11b into two adjacent sections 11d and 11e to contain a sample fluid, and a reference fluid, respectively, therein. Windows 11f close the ends of sections 11e and 11d to thereby form said sections of the refractometer cell unit. Prism 15 is positioned at the focal point of lens 13 which results in an image of slit 5 being projected upon the radiation detectors 17a and 17b. The rectangular glass plate 18, which is manually adjustable, is positioned in the beam of radiation as it emerges from prism 15 and provides a means for initially adjusting the light beam to fall upon the preselected position upon detector unit. Prism 16 is positioned in the beam of radiation and in front of detector unit 17 so that an equal portion of the beam strikes detectors 17a and 17b when the beam is initially adjusted. As long as the refractive indices of the two fluids in sections 11d and 11e are equal, the light beam emerges in the same path from refractometer cell 11 as the path followed when it entered cell 11 and is reflected by prism 15 to the preselected position upon detectors 17a and 17b. If the refractive indices of the two fluids vary, such as to deviate the emerging beam upward from cell 11, for example, then prism 15 is rotated on shaft 21 until the beam is returned to the preselected position upon detectors 17a and 17b.

The angular position telemetering circuit, which translates the analytical data obtained at a remote point by the previously described differential refractometer to an indicator-recorder and which in combination with said remotely-positioned differential refractometer and indicator-recorder constitutes my invention, will now be described in detail. Referring to Figures 1 and 2, the angular position telemetering circuit comprises the previously mentioned potentiometer 53 having a slide wire resistance 91 and a movable contact 93 engaged thereupon. Movable contact 93 is made of an electrically conductive material in contact with slide wire resistance 91 and imbedded in an insulating material mechanically connected to shaft 51. Movement of contact 93 upon slide wire resistance 91 is controlled by the rotation of shaft 51 which is driven through the previously described mechanical linkage by motor 33. Also included in the telemetering circuit is a potentiometer 95, similar to potentiometer 53, an amplifier 97, a two-phase reversible motor 99 and a transformer 101. Amplifier 97 has a source of power 96, a pair of input terminals 115 and 117 and a pair of output terminals 119 and 121. A source of power 127 energizes transformer 101 and one phase winding of motor 99. Obviously, amplifier 97, transformer 101 and motor 99 can be connected to one source of power, the two sources, 96 and 127, being shown for clarity in the drawing. Potentiometer 95 has a slide wire resistance 103 and a movable contact 105, constructed similarly to movable contact 93, engaged thereupon.

One important feature of my invention is the installation of two adjustable resistances, 107 and 109, on the ends of slide wire resistance 103. As was previously mentioned, the rotation of shaft 51, which drives movable contact 93 on slide wire resistance 91 in potentiometer 53, is limited to from 10 percent to 90 percent of its full rotation by cam stop member 83 and associated parts. Thus, the movement of contact 93 on slide wire resistance 91 is limited to the same extent. By utilization of adjustable resistances 107 and 109, on the ends of slide wire resistance 103, the ratio of the resistance above to the resistance below contact 105 on slide wire resistance 103 in potentiometer 95 is made equal to the ratio of the resistance above to the resistance below contact 93 on slide wire resistance 91 in potentiometer 53, permitting calibration of the indicating and recording devices from 0 to 100 percent of their scales.

An alternating current voltage from the secondary winding of transformer 101 is applied across the slide wire resistances of potentiometers 53 and 95. Referring to Figure 2, and considering $R_1$ and $R_3$ as the resistances of potentiometers 53 and 95, respectively, below the movable contacts 93 and 105, and considering $R_2$ and $R_4$ as the resistances of potentiometers 53 and 95, respectively, above the movable contacts 93 and 105, a Wheatstone bridge is formed. Movable contacts 93 and 105 are connected by leads 111 and 113, respectively, to the input terminals 115 and 117, respectively, of amplifier 97. The output terminals 119 and 121 of amplifier 97 are connected by leads 121 and 125, respectively, to one phase winding of motor 99. The other phase winding of motor 99 is energized by the 110 volt alternating current source 127 which also energizes transformer 101. Motor 99 has a motor shaft 129 carrying a worm gear 131 which meshes with spur gear 133 carried on a shaft 135, rotatably supported by means not shown. Shaft 135 also carries a pulley wheel 137 which is operatively connected to a pulley wheel 139 by a pulley belt 141. Attached to pulley wheel 139 is a pulley wheel 143 which is operatively connected to a pulley wheel 145 by a pulley belt 147. Pulley belt 147 carries movable contact 105 which is thereby driven to its position on slide wire resistance 103 by motor 99.

It is thus apparent that transformer 101 provides the Wheatstone bridge voltage supply and that amplifier 97 amplifies the bridge output voltage sufficiently to energize motor 99 which moves contact 105 until the input signal to amplifier 97 is reduced to zero. At such a balanced condition the relationship of $R_1$, $R_2$, $R_3$, and $R_4$ can be expressed as $$\frac{R_1}{R_2}=\frac{R_3}{R_4}$$

and consequently the position of contact 105 corresponds exactly to the position of contact 93. Because of the balanced bridge arrangement, the position of movable contact 105 is essentially independent of the bridge supply voltage and of the amplifier gain.

The indicator-recorder associated with the apparatus of my invention is schematically shown in Figures 1 and 2. A chart 149 has uniformly distributed horizontal graduations and is moved in a vertical path in accordance with time by timer motor 151 having a power source 153. Motor 151 has a motor shaft 155 which is connected to and rotates chart roller 157 on which is rolled chart 149. A marking pen 159 is engageable upon chart 149 and is mechanically connected to movable contact 105, thus indicating and recording simultaneously the position of contact 105. The indicator-recorder is installed in a control panel of otherwise conventional construction and which is not shown for purposes of clarity in the drawing.

In the operation of the apparatus of my invention, the differential refractometer is placed at a remote position, for example, adjacent to a fractional distillation column or a cracking furnace, concerning which analytical data is desired. An important advantage of my invention is that the differential refractometer is remotely positioned and, thus, may be placed adjacent to the fluid stream, the composition of which is to be recorded and/or controlled. Since the indicator-recorder associated with my invention is placed at a central control zone, my apparatus is more adaptable to use in explosive atmospheres. Sample lines are shortened and sample volumes are lessened by the remote positioning of the differential refractionator, also.

When a sample fluid is placed in the refractometer cell unit, the light beam is refracted from its initially selected central position on detector unit 17 so that more radiation impinges on one of detectors 17a and 17b than on the other and a voltage of a characteristic polarity is produced by the electrical circuit connecting detectors 17a and 17b in opposition. The voltage is amplified and supplied to motor 33. The output rotation of motor 33 is applied through the described mechanical linkage to rotate totally-reflecting prism 15 which is mounted on rotatable shaft 21 and to position the movable contact 93 of potentiometer 53.

As the composition of the fluid sample varies, the voltage output from detector unit 17 and the resulting output rotation of motor 33 vary correspondingly. Thus the angular position of rotatable shaft 21, on which is mounted prism 15, is characteristic of the difference between the refractive indices of the sample fluid and the reference fluid.

The angular position telemetering system of my invention transmits the angular position of shaft 21 to the recorder-indicator at a central control zone. The division of the resistances of potentiometers 53 and 95 by their movable contacts 93 and 105, respectively, forms the legs of a Wheatstone bridge, the power for which is supplied from the secondary winding of transformer 101. Movable contacts 93 and 105 are connected by leads to the input of amplifier 97 and the secondary winding of motor 101 is energized by the output of amplifier 97. When movable contact 93 is moved by motor 33, the bridge circuit produces an unbalance voltage which is amplified and supplied to motor 97 which drives contact 105 of potentiometer 95 to a null or balanced position. The movable contact 105 is mechanically connected to a marking pen 159 engageable upon a chart 149 which is moved in accordance with time by timer motor 151. The advantages of such a simple electrical angular position translating system will be apparent to those skilled in the art. There is only a small number of fixed resistances and the utilization of 60 cycle alternating current is a great convenience over battery powered systems.

Of importance in the angular position telemetering system is the provision of adjustable resistance 107 and 109 at the ends of the slide wire resistance in potentiometer 95. These adjustable resistances permit full scale operation of the indicator-recorder although the movement of movable contact 93 in potentiometer 53 is limited by the previously described cam stop member 83 and associated parts. The limitation on the movement of contact 93 is necessary to prevent the stops of potentiometer 53 from being broken in the event of a large change in sample composition.

The overall arrangement of the invention is shown in Figure 1. It will be apparent that I have accomplished the major objective of this invention which is to provide a remotely-positioned differential refractometer, and an angular position telemetering system to translate the analytical data from the differential refractometer to an indicator-recorder. While certain preferred embodiments of this invention have been described for illustrative purposes, the invention obviously is not limited thereto.

I claim:

1. An analytical system for a process wherein a sample is withdrawn for analysis from a selected location, a differential refractometer at said selected location so that it is connected by short sample lines to receive a sample for analysis, said refractometer having a rotatable shaft, the angular position of which varies in accordance with changes in composition of said sample, a first variable impedance having a control element mechanically connected to said shaft, a second variable impedance at an indicating and control location remote from said selected location, a motor at said indicating and control location mechanically connected to a control element of said second variable impedance, a recorder at said indicating and control location having an indicating member mechanically connected to said motor, an amplifier at said indicating and control location having a pair of input terminals and having its output connected to said motor, a lead connecting one input terminal to the control element of said second variable impedance, a current source, and a set of leads extending from said indicating and control location to said selected location, said set of leads connecting the other input terminal to the control element of said first variable impedance, and connecting said current source and said variable impedances in a balanced bridge circuit, whereby the motor shaft and the rotatable shaft of the refractometer move in unison and the output of the refractometer is efficiently telemetered to said indicating and control location.

2. An analytical system for a process wherein a sample is withdrawn for analysis from a selected location, a differential refractometer at said selected location so that it is connected by short sample lines to receive a sample for analysis, said refractometer including a cell connected to receive said sample, a cell containing a standard fluid, a rotatable prism of the totally reflecting type, a pair of radiation detectors, a source of radiation arranged to direct a radiation beam through said cells onto said prism and, thence, to said radiation detectors, a first amplifier having a set of input terminals connected to said radiation detectors, a first motor connected to the output terminals of said amplifier and having a rotatable shaft mechanically connected to said prism, whereby changes in refractive index of the sample cause a deflection of said radiation beam resulting in movement of said motor and prism to maintain a balanced amount of radiation incident upon the respective radiation detectors so that the angular position of the motor shaft varies in accordance with changes in composition of the sample, an indicating device mechanically connected to the shaft of said motor, and a first variable impedance having a control element mechanically connected to said shaft, a second variable impedance at an indicating and control location remote from said selected location, a second motor at said indicating and control location mechanically connected to a control element of said second variable impedance, a recorder at said indicating and control location having an indicating member mechanically connected to said motor, a second amplifier at said indicating and control location having a pair of input terminals and having its output connected to said second motor, a lead connecting one of the last-mentioned input terminals to the control element of said second variable impedance, a current source, and a set of leads extending from said selected location to said indicating and control location, said set of leads connecting the other of said last-mentioned input terminals to the control element of said first variable impedance, and connecting said current source and said variable impedance in a balanced bridge circuit, whereby both motor shafts move in unison and the output of the refractometer is efficiently telemetered to said indicating and control location.

References Cited in the file of this patent

UNITED STATES PATENTS

| | | |
|---|---|---|
| 1,086,729 | Rey | Feb. 10, 1914 |
| 1,822,075 | Aronoff | Sept. 8, 1931 |
| 2,420,415 | Bristol | May 13, 1947 |
| 2,483,102 | Pierson | Sept. 27, 1949 |
| 2,612,814 | Glasser | Oct. 7, 1952 |
| 2,624,014 | Barstow | Dec. 30, 1952 |